May 10, 1927.

H. M. SMITH 1,627,623

STREAM DEFLECTOR AND RIVER BANK PROTECTOR

Filed Oct. 23, 1925

INVENTOR.
Harry M. Smith
BY
Philip A. H. Jenell
ATTORNEY.

Patented May 10, 1927.

1,627,623

UNITED STATES PATENT OFFICE.

HARRY M. SMITH, OF VALLEY, NEBRASKA.

STREAM DEFLECTOR AND RIVER-BANK PROTECTOR.

Application filed October 23, 1925. Serial No. 64,371.

The invention relates to stream deflectors and river bank protection and has for its object to provide a means of accomplishing this result by the employment of scrap metal material, preferably a plurality of automobile chassis connected at or near the center of each section by wire strands in the form of a cable. It has been found by severe tests that the wire strand method of joining metal frames is preferable to the use of bolts for this purpose. There are two objections to the use of bolts in joints of this kind, the one being the drilling of a hole through the metal weakens the metal at that point so that when the pressure of large bodies of ice or other material contacts with the outwardly extending extremities of the metal frame, the metal is broken at this weakened point. Another objection to this method of joining the sections is that the bolts are sheared by the constant movement of the metal channels or angles as may be used. It is to be understood that other material other than automobile chassis may be used for this purpose, however it is an object of the invention to use the lowest cost material obtainable and as the use of automobiles increase a large surplus of material of this kind is provided.

It has also been found that wire strand method of joining sections is preferable to chains which are sometimes used for this purpose, in fact the wire strand method has the advantage of giving some flexibility to the channels or angles where they are joined together and at the same time making this joint more rigid than it is possible to make by the use of chains. Strands of wire are used to connect the outer extremities of the chassis frames in a manner that braces them one to the other.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
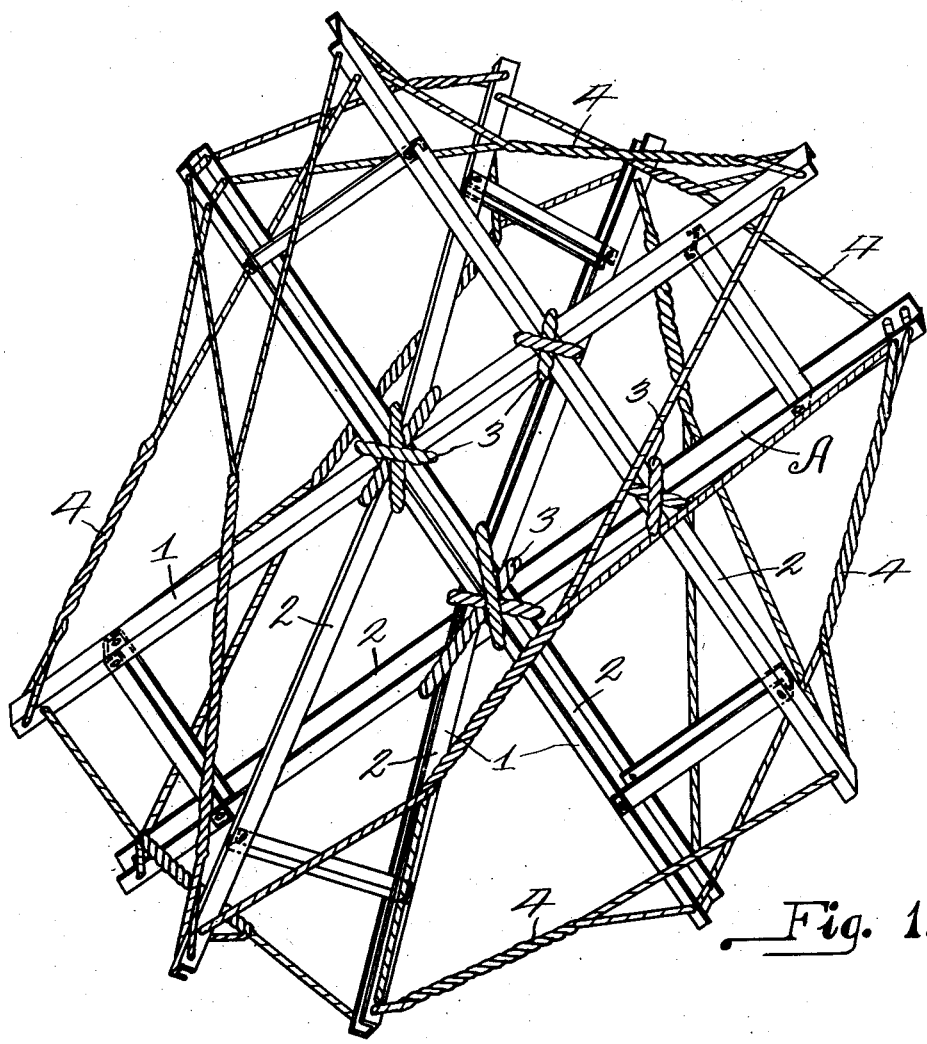
Figure 1 is a plan view of an assembly of automobile chassis bound together and stayed by strands of wire.
Figure 2:
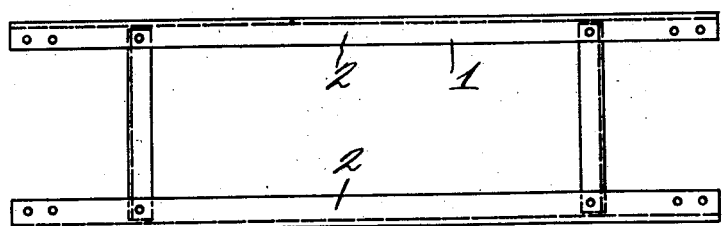
Figure 2 is a single section of the assembly of an automobile chassis.

Referring to the drawing the letter A designates a stream deflector unit, any number of which may be used adjacent a bank for preventing erosion thereof and collecting silt and building up a dam or the bank. The stream deflector unit comprises a plurality of crossed rectangular shaped frames 1, preferably formed from channeled iron and from old automobile frames, however it is to be understood that any kinds of frames may be used, but old automobile frames are relatively cheap and can be obtained in large quantities. Heretofore in devices of this character the longitudinal channels 2 of the frames have been secured together where they cross by means of bolts, however it has been found that by drilling the channels and crossed members, the channels are materially weakened and often break incident to the great strain to which they are subjected. It has also been found that where the channels do not break the bolts are sheared, consequently the structure is not a relatively rigid one and will collapse. It has also been found where the crossed channels are secured together by twisted wires 3, the wires do not shear and there is a slight yieldability which obviates shearing, and at the same time sufficient rigidity is provided for maintaining the frames in relative position in combination with the wire strand connections 4, which connect the ends of the frames. The wire binding at 3 not only accomplishes the above result but obviates an expensive drilling operation and allows the stream deflector unit to be quickly assembled with the minimum amount of labor of an unskilled character, and the amount of material used for the wiring 2 is relatively small and of the same character as the wire connections 4, all of which points are material elements when it is considered that a dam formed from the device often runs into several hundred units.

From the above it will be seen that a binding means is provided for the crossed bars of a stream deflector which will obviate the use of bolts and will connect the crossed bars together so that they can yield slightly in relation to each other and obviate shearing and the use of bolts of any kind.

The invention having been set forth what is claimed as new and useful is:—

1. A stream deflector unit comprising three oblong shaped frames, said frames having end bars, side bars carried by each of said frames, two of said frames crossing each other at angles and in parallel plane and in engagement with each other, securing means connecting the bars of the frame, the third frame extending through one of the first mentioned frames at an angle and in a plane other than a parallel one, said securing means for the first mentioned frame also forming means for holding the last mentioned frame.

2. A stream deflector comprising a plurality of elongated rectangular shaped frames having end and side bars, said frames being in crossed relation, one of said frames being centrally restricted and extending through one of the other frames, said frames being proportioned whereby when the device rests on any side or portion thereof, one bar of each frame will form part of a tripodal support for the deflector.

In testimony whereof I affix my signature.

HARRY M. SMITH.